Nov. 27, 1962 S. LIPSCHUTZ ETAL 3,065,894
DISPENSER PACKAGE
Filed Feb. 19, 1960 2 Sheets-Sheet 1
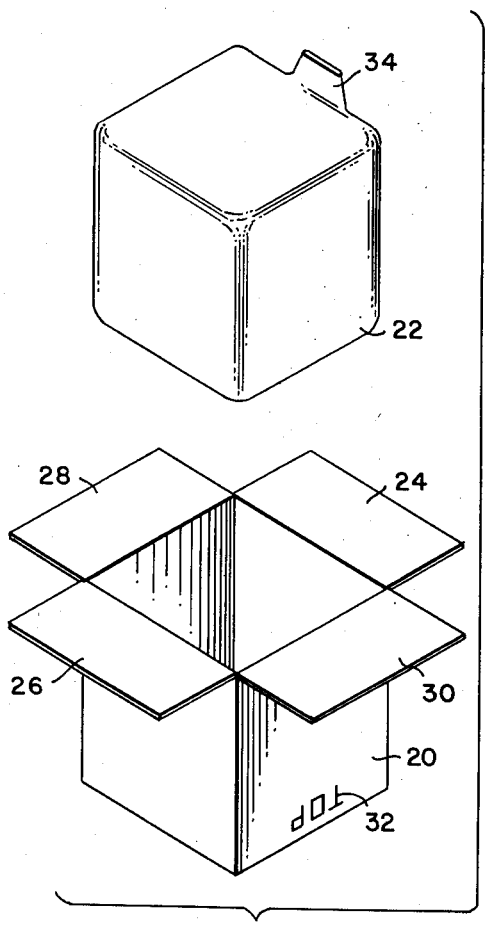
Fig. 1.
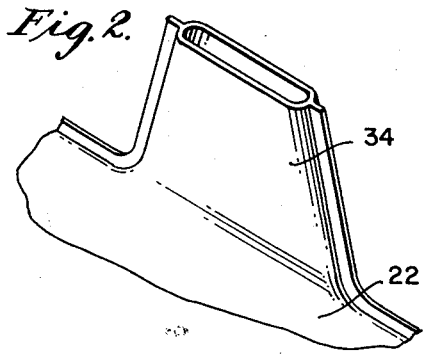
Fig. 2.
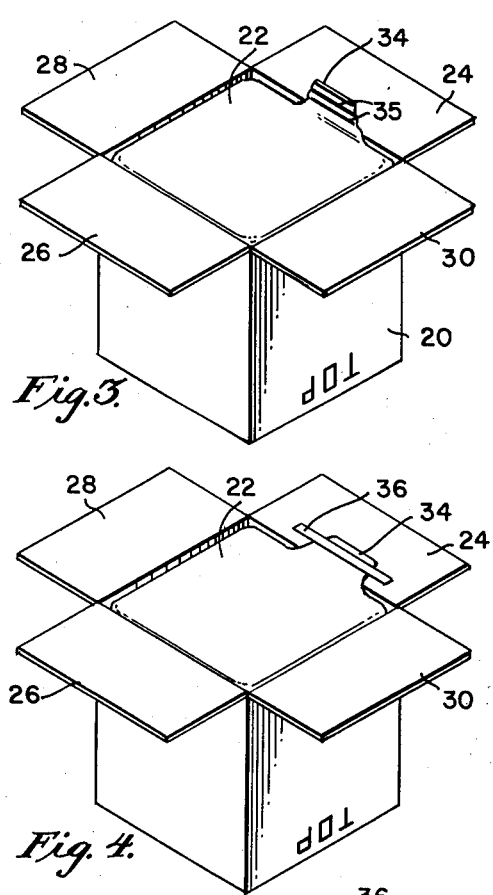
Fig. 3.
Fig. 4.
Fig. 5.
INVENTORS.
SIDNEY LIPSCHUTZ
EDWARD H. BARNETT
BY
Caesar and Rivise
ATTORNEYS.

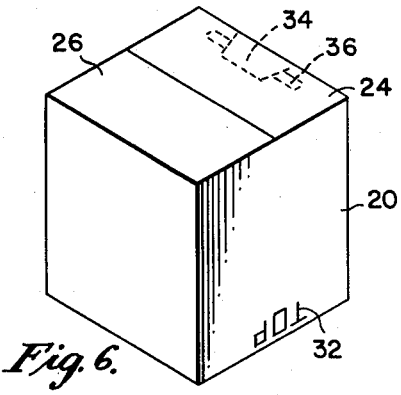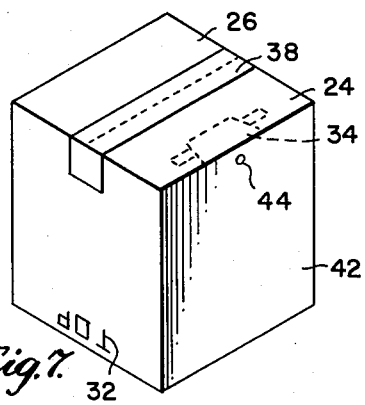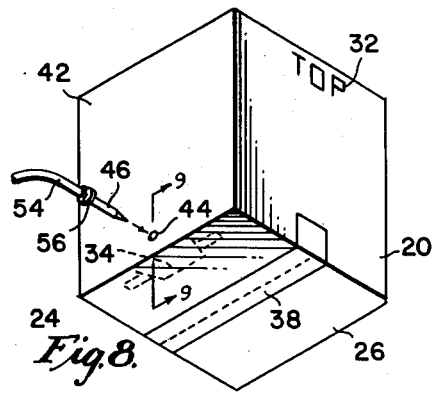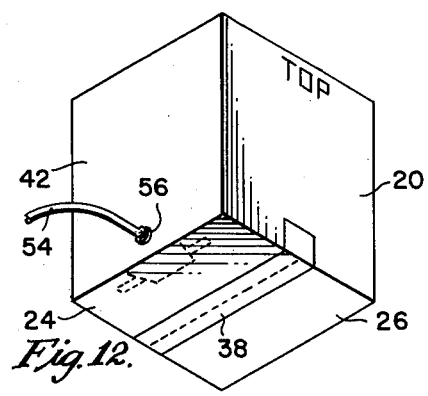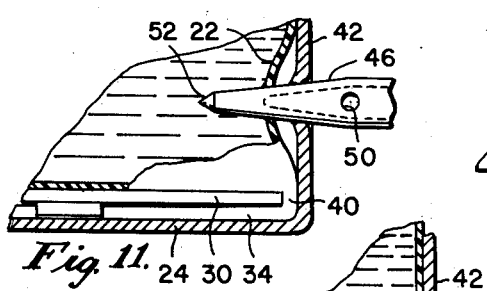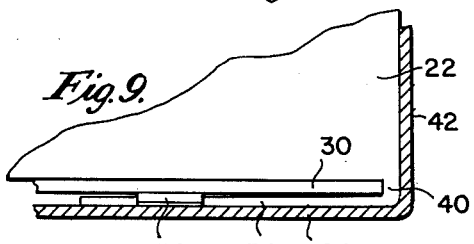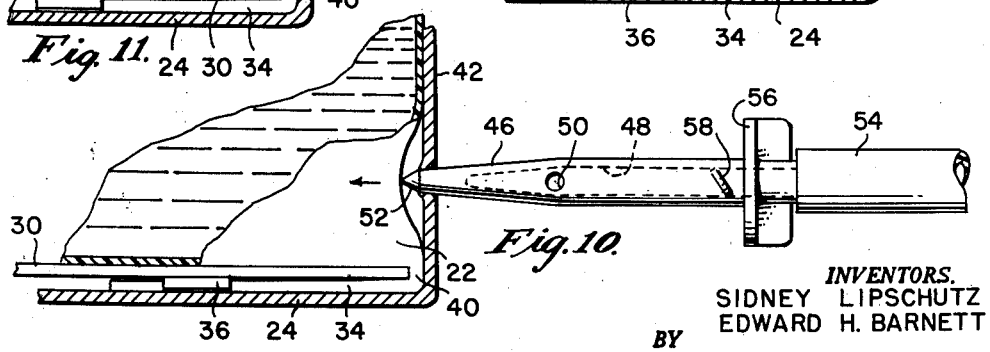

United States Patent Office 3,065,894
Patented Nov. 27, 1962

3,065,894
DISPENSER PACKAGE
Sidney Lipschutz, Merion, and Edward H. Barnett, Roslyn, Pa., assignors to Standard Products Co., Inc., Philadelphia, Pa., a corporation of Pennsylvania
Filed Feb. 19, 1960, Ser. No. 9,898
2 Claims. (Cl. 229—14)

This invention relates to a dispenser package of the type having a rigid outer container and a flexible inner container to which access can be had by means of a tubular probe for dispensing fluids from the package.

One use of such a dispenser package has been for the carrying of the electrolyte of automobile storage batteries. Storage batteries which are stored in the so-called "dry" condition may be filled with battery acid at a service station when the battery is sold. A dispenser package of the aforementioned type has been found to be useful for supplying acid for this purpose.

It is convenient to insert a pointed tubular probe into the package including the inner container, thereby providing a simple dispensing element for the battery acid. However, it has also been found that due to the resilience of the flexible inner container, which may be in the form of a bag, and due to the thickness which has been provided for safety's sake, the bag is sometimes not easily pierced by the aforementioned probe. The bag, in such instance, has a tendency to slide away from the pressure of the probe so that insertion of the probe is difficult. In addition, the insertion may be a faulty one so that leakage around the probe may occur.

It is an object of this invention to overcome the above difficulties by providing a new and improved dispenser package of the type having a rigid outer container and a flexible inner container for dispensing fluids wherein the inner container will be held against movement under the pressure of the probe during insertion.

Another object of this invention is to provide a new and improved dispensing package in which connection of the probe to the inner container is conveniently and reliably attained.

Another object of this invention is to provide a new and improved dispenser package to which a dispensing probe may be attached in such a manner that battery acids may be safely dispensed therefrom.

Another object of this invention is to provide a new and improved dispenser package and probe combination which is relatively simple in construction and inexpensive to manufacture.

In accordance with this invention, a flexible bag is inserted into a paperboard box of the type having pairs of flaps that fold transversely to close the box. The bag is provided with a spout that is fastened to one of the flaps so that the flaps may be folded down and the bag held tightly between the flaps in fastened condition. Indicating means is provided on the outside of the box, at the side adjacent the spout of the bag. This indicating means marks a point of insertion of the piercing probe. By means of this arrangement, the bag is held firmly in position when the probe is pressed against it so that a clean piercing insertion is insured.

The foregoing and other objects of this invention as well as features of the invention and the invention itself may be best understood from the following description when read together with the accompanying drawing, in which;

FIG. 1 is an exploded perspective view of the flexible and rigid containers forming the dispenser package of this invention;

FIG. 2 is a detailed perspective view of the mouth of the flexible container of FIG. 1;

FIGS. 3, 4, 5 and 6 are perspective views similar to that of FIG. 1 showing the assembly of the package of this invention in successive stages;

FIG. 7 is a perspective view of the assembled package of FIG. 6 viewed from a different direction;

FIG. 8 is a perspective view of the assembled package of this invention together with a probe ready for insertion;

FIG. 9 is a sectional view along the line 9—9 of FIG. 8;

FIG. 10 is a sectional view similar to that of FIG. 9 together with a probe in position for insertion;

FIG. 11 is a fragmentary sectional view similar to FIG. 10 but showing the probe after insertion in the inner container.

FIG. 12 is a perspective view similar to that of FIG. 8 showing the assembled package and probe.

In the drawing, corresponding parts are referenced by the same numerals.

A dispenser package, as shown in FIG. 1, includes a paperboard rectangular box 20 and a flexible inner container or bag 22. The box 20 may be fabricated of common corrugated board with pairs of oppositely folding flaps 24, 26 and 28, 30 for closing the container. In use, the box 20 would have printing thereon, for example, in the form of directions for use and a description of the contents of the package together with the name of the manufacturer in the usual form. This printing is represented by lettering 32 on the box indicating the top of the box. Thus the flaps 24—30 are located at the bottom of the box.

The bag 22 may be made of various types of flexible plastics such as polyethylene, or polyvinylchloride, or similar synthetic resins. The bag is formed as a cube similar in shape and size to the box 20 so that it fits closely within that box 20. The bag may be fabricated of shaped extruded sheets of plastic that are sealed along their edges. Formed along one edge of the bag 22 is a spout 34 which may be an extension of the adjacent two sides of the bag 22 (FIG. 2). The spout 34 forms a mouth for the bag 22 and may be used for filling the bag with fluid.

As shown in FIG. 3, the bag fits snugly into the box and can be filled when in this partially assembled condition. After the bag 22 is filled, the spout 34 can be sealed if desired by a heat application across the spout 34 as indicated at 35 in FIG. 3.

A fastening strip 36 is applied across the spout 34 to firmly attach the spout 34 to the inner surface of flap 24. This stage of the assembly is shown in FIG. 4. Flaps 28 and 30 are then folded across the bag as shown in FIG. 5 with the spout 34 still attached to the inside surface of the flap 24 as seen in the view of FIG. 5. Then the flaps 24 and 26 are folded over, with the spout 34 in position between the pairs of flaps, as shown in FIG. 6. An adhesive strip 38 may be applied across the edges of the flaps 24 and 26 to retain them in the folded condition.

In this fully assembled condition, the spout 34 of the bag 22 is retained between the outside flap 24 and the two inside flaps 28 and 30. As seen in FIG. 9, which shows the spout 34 inverted, a constriction is formed in the bag at the end of the spout 34 as it passed around the inside flaps 30 and 28 and between those flaps and the flap 24. The flaps 28 and 30 are about the same length as the box itself so that these flaps substantially fill the inside of the box. Therefore the constriction 40 formed between the edges of the flaps 30 and 28 and the side of the box 42 is a tight one and tends to seal the bag. The view in FIG. 9 of the constriction 40 is somewhat enlarged for convenience of illustration. With this arrangement, the spout 34 is locked firmly into position, which insures that the adjacent portions of the bag 22 are likewise held firmly in position.

As viewed in FIG. 7, the side 42 adjacent the spout 34 and flap 24 has an indicating mark 44 thereon, which directs the user to the point of insertion of a probe 46 (FIG. 10). The indicating mark 44 is close to the bottom of the box adjacent the folding edge flap 24 and adjacent the portion of the bag 22 connected to the spout 34.

The probe 46 is generally cylindrical in shape with a hollow channel 48 that opens through an aperture 50 adjacent the pointed end 52 thereof. The channel 48 passes through the other end which is fitted into a flexible hose 54 or the like which may be valved by any suitable means (not shown). A flange 56 forms a retaining shoulder for the probe 46 that engages the outside surface 42 of the box. A tooth 58 has an inside edge spaced from the flange 56 by approximately the thickness of the box wall 42 for a reason which will be described hereinbelow. A similar tooth (not shown) is on the opposite side of the probe 46.

In use, the probe 46 is inserted into the packaged box 20 with that box in the upright position. This position is illustrated in FIG. 8 with the probe 46 directed at the mark 44 for insertion through the box 20. The probe 46 is made of a non-corrosive hard material such as rubber, acrylic resin or a suitable metal. The pointed end 52 readily pierces the wall 42 of the box and presses against the wall of the bag 22. The bag wall is of relatively thick material to insure a sturdy package, and it tends to yield under the pressure of the pointed end 52, as illustrated in FIG. 10. However any yielding of the bag 22 is negligible in view of the constriction 40 holding the bag 22 from the end position. The fastened spout 34 and constriction 40 insure that the bag is retained firmly in position and cannot move away or yield materially so that full pressure can be applied with the probe 46 to pierce the bag. Thus the probe 46 cuts cleanly through the bag 22 and substantially at right angles to the surface of the bag as shown in FIG. 11.

The material of the bag 22 is such that it tends to adhere tightly to the probe 46 to form a tight seal. The probe 46 is inserted full into the bag with the shoulder of flange 56 resting against the wall 42. In this position, the tooth 58 is torn through the wall 42 and rests between the bag 22 and the inside of the wall of the box 42. By a twist of the flange 56, the tooth 58 is positioned against an untorn portion of the wall 42 to lock the probe 46 in position with the wall 42 firmly held between the flange 56 and the tooth 58.

The probe is then in condition to dispense the fluid from the bag 22 via the hose 54 and an appropriate valve (not shown). Due to the clean hole formed by the pointed tip 52 pressed substantially at right angles against the bag 22, the bag 22 tends to maintain a tight seal with the probe 46. To remove the probe 46, the flange 56 may be rotated back in the opposite direction to unlock the tooth 58 and remove the probe from the bag and box.

It is seen from the foregoing description that a new and improved dispenser package is provided whereby a dispensing probe may be readily applied to a rigid container and to a flexible bag within the rigid container to dispense fluids therefrom. This package is simple in construction and easy to manufacture. It is convenient to assemble as well as to use. It insures a safe dispensing arrangement for dangerous acid fluids.

The foregoing description of a preferred embodiment of this invention is not to be construed as a limitation on the scope of this invention. Variations and modifications of the construction of this invention will be apparent to those skilled in the art.

What is claimed as the invention is:

1. For use with a dispensing probe, a package for dispensing liquid comprising a resilient, flexible plastic bag containing a liquid and having a foldable spout of substantially less size than the width of the bag, a rigid box of similar size and shape and including a plurality of transversely folding flaps, said bag being inserted in said box with an adhesive strip fastening said spout to the inside of a first one of said flaps, said flaps being folded and held in box closing position with a second one of said flaps folded transversely to said first flap to cover said bag and said first flap folded to cover said second flap with said spout therebetween, said box being adapted to receive said probe at a side thereof adjacent the folding edge of said first flap, whereby said probe can easily pierce the plastic bag, while preventing any leaking caused by excess tearing of the bag.

2. For use with a dispensing probe, a package for dispensing liquid comprising a resilient, flexible plastic bag containing a liquid and having a foldable spout of substantially less size than the width of the bag, a rigid box of similar size and shape and including a plurality of transversely folding flaps, said bag being inserted in said box with said spout attached to a first one of said flaps, said spout being heat sealed prior to being attached to said flap, said flaps being folded and held in box closing position with a second one of said flaps folded transversely to said first flap to cover said bag and said first flap folded to cover said second flap with said spout therebetween, said box being adapted to receive said probe at a side thereof adjacent the folding edge of said first flap, whereby said probe can easily pierce the plastic bag, while preventing any leaking caused by excess tearing of the bag.

References Cited in the file of this patent

UNITED STATES PATENTS

| | | |
|---|---|---|
| 2,089,483 | Jaenicke | Aug. 10, 1937 |
| 2,552,154 | Danielson | May 8, 1951 |
| 2,866,488 | Thompson | Dec. 30, 1958 |
| 2,954,901 | Winstead | Oct. 4, 1960 |

UNITED STATES PATENT OFFICE
CERTIFICATE OF CORRECTION

Patent No. 3,065,894                                                 November 27, 1962

Sidney Lipschutz et al.

It is hereby certified that error appears in the above numbered patent requiring correction and that the said Letters Patent should read as corrected below.

In the grant, lines 2 to 4, for "assignors to Standard Products Co., Inc., of Philadelphia, Pennsylvania, a corporation of Pennsylvania, read -- assignors, by mesne assignments, to Chemical Sales, Inc. of Philadelphia, Pennsylvania, a corporation of Pennsylvania, --; line 13, for "Standard Products Co., Inc., its successors" read -- Chemical Sales, Inc., its successors --; in the heading to the printed specification, lines 4 and 5, for "assignors to Standard Products Co., Inc., Philadelphia, Pa., a corporation of Pennsylvania" read -- assignors, by mesne assignments, to Chemical Sales, Inc., Philadelphia, Pa., a corporation of Pennsylvania --.

Signed and sealed this 21st day of May 1963.

(SEAL)
Attest:

ERNEST W. SWIDER                                             DAVID L. LADD
Attesting Officer                                              Commissioner of Patents